Inventor
H. S. LEMAN
By Robert Harding Jr.
Attorney

Dec. 8, 1959 H. S. LEMAN 2,916,558

TELEPHONE SIGNALLING SYSTEMS

Filed April 24, 1956 2 Sheets-Sheet 2

Inventor
H. S. LEMAN
By Robert Harding Jr.
Attorney

United States Patent Office 2,916,558
Patented Dec. 8, 1959

2,916,558

TELEPHONE SIGNALLING SYSTEMS

Hugh Spence Leman, London, England, assignor to International Standard Electric Corporation, New York, N.Y., a corporation of Delaware Application April 24, 1956, Serial No. 580,362

Claims priority, application Great Britain May 6, 1955

10 Claims. (Cl. 179—81)

Figure 1:
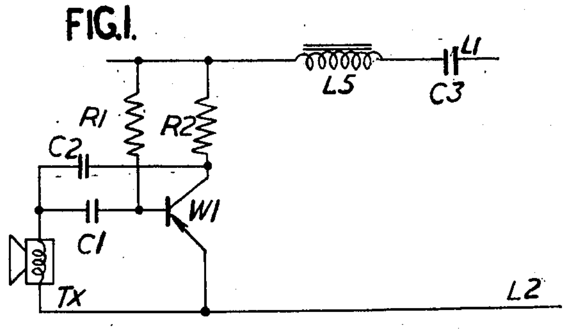

This invention relates to telephone substation apparatus, with particular reference to signalling means therefor.

The increasing use of transistors (crystal triodes) in communication equipment and their application to telephone subscriber's station apparatus has led to consideration being given to forms of calling devices which could be used with a "transistorised" telephone sub-set. The normal bell-type ringer occupies a great deal of space in a telephone set, disproportionately so to the space occupied by the other components in a transistorised set; and further, when transistors are used, it is necessary, on account of their present cost, to eliminate unessential components or to simplify construction in order to keep down cost.

According to the present invention there is provided a telephone subscriber's set comprising an electro-magnetic transducer constituting the transmitter of the set, and a transistor oscillator circuit adapted to oscillate in response to an incoming electrical signal and to generate voice frequency currents for activating said transducer to emit a calling tone.

The invention also provides a set of the above character for use as a local battery set wherein a normally-closed circuit connecting said transistor oscillator across the telephone talking wires includes a change-over contact set which in its off-normal position connects a local battery across the talking wires in an outgoing calling-and-ringing circuit for a similar, remote, subscriber's set, and wherein said outgoing calling-and-ringing circuit includes an impedance across which the local receiver is shunted, whereby ringing tone generated in such a remote subscriber's set in response to a ringing signal from a local subscriber's set can be detected as a ring-back tone.

It is known that an adequate calling signal can be produced by a telephone transducer and arrangements will be described herein for the use of the microphone transducer in a telephone subset as a calling device. This is made possible by the fact that the use of transistors in a telephone set permits electromagnetic transducers to be used both for receiving and for transmitting, and by the use particularly of the transmitting unit as the calling device, several advantages are secured. Circuit conditions might arise, for example, in which the calling tone was applied and produced in the receiver (if used for calling) while it was on the ear of the listener, and then the high signal level would be very disturbing and might even damage the ear. Moreover, the use of the receiver for calling would prevent the use of click suppressors for normal use without complicated or special switching.

The use of the microphone transducer for calling obviates these disadvantages.

To be effective, the calling signal produced by the transducer should be in the range 1000 to 3000 c./sec. The higher frequencies are more penetrating and thus more adapted to attract attention, and the radiation from the transducer is better at the higher frequencies.

An oscillator circuit will be described which uses the inductance of the electro-magnetic transmitter as the inductive component for an L–C transistor oscillator, and this same unit is the source of sound for the calling signal. The power for operating the calling oscillator is derived from the calling party, being either 75 volt ringing current of the usual frequency (for common battery operation) or the calling subscriber's local battery (for local battery operation). With ringing current, a penetrating note modulated at ringing frequency can be produced for the longest lines in use on existing telephone systems.

The accompanying drawing illustrates the invention applied to telephone subsets.

Figure 2:
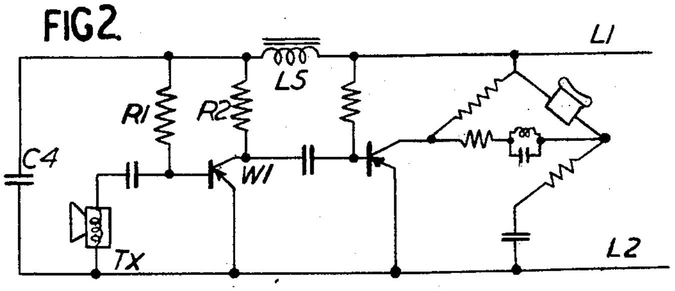
Figure 3:
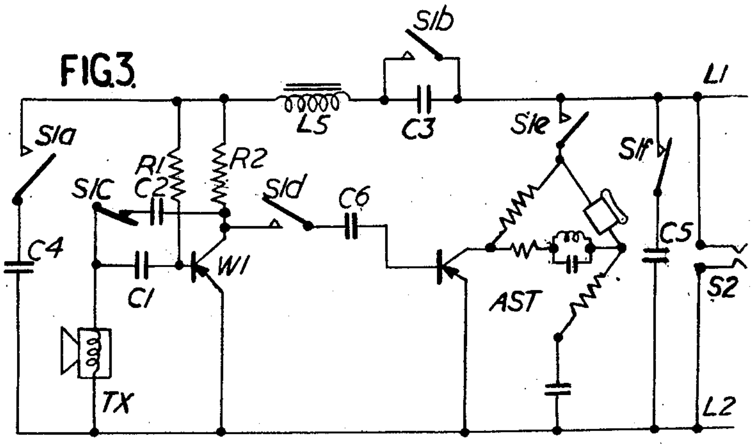
Figure 4:
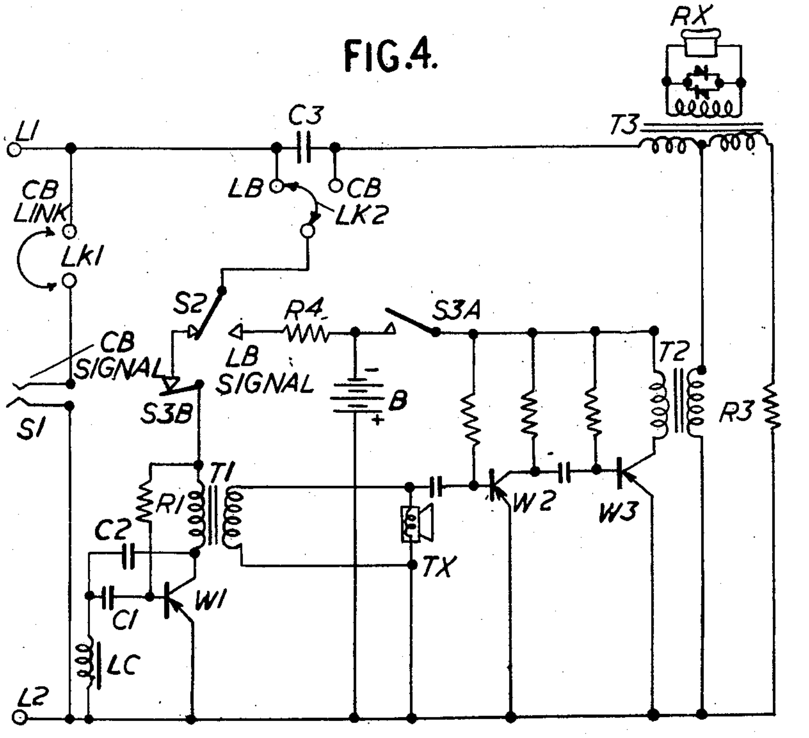

Fig. 1 showing a transistor oscillator circuit for use on D.C. and ringing current;

Fig. 2 shows the oscillator applied to a common battery system as a microphone amplifier;

Fig. 3 showing the same as Fig. 2, but with alternate, optional connections for converting the microphone amplifier to a calling oscillator; and Fig. 4 showing the oscillator applied to a common battery or local battery system at choice.

Referring now to Fig. 1, the basic transistor oscillator circuit used comprises a junction transistor W1 having the coil of an electro-magnetic transducer TX in the collector circuit so that the transducer may act both as oscillator inductance and sound source. Bias resistor for the base is constituted by R1, while R2 is the collector load resistor. Capacitor C1 is a frequency determining element in association with TX, and C2 is a regenerative feed-back connection. Power supplies are intended to be provided over lines L1, L2, via series inductor L5, a decoupling element, and in the presence of isolating capacitor C3, such supplies will be of alternating current.

With 10 volts of A.C. at 20 c./s., for example, the circuit oscillated at 1500 c./s., modulated at 20 c./s., giving a suitable audible calling signal in the transducer.

The high effective resistance of the transducer introduces difficulties not encountered with a high Q inductance in the circuit, but experiments have shown that the circuit can be made to oscillate provided the Q is in the region of 2, a frequency between 1000 c./s. and 3000 c./s. being obtained with a rocking armature transducer wound to an impedance of 1000 ohms at 1000 c./s.

The circuit just described, without the capacitor C2, constitutes a normal transistor amplifier for the transducer in the emitter circuit, and can thus be used as the initial (microphone) stage in a transistor-amplifier sub-set circuit, as shown in Fig. 2. In this figure, it will be seen that the portion to the left of the inductance L5 comprises the oscillator of Fig. 1, without the capacitor C2. The capacitor C4 bridging the microphone amplifier is provided to prevent feedback round the preamplifier stage by decoupling the upper ends of R1 and R2.

For use of the circuit of Fig. 2 as a normal subset circuit, provision must be made for a "gravity switch" to convert from the "calling" to the "talking" condition. The necessary circuit arrangement is shown in Fig. 3. In this figure, certain of the connections are shown interrupted by contacts *a* to *f* of a switch S1, the contacts being shown closed in the calling condition (i.e., waiting for an incoming call).

Thus, for the calling condition, contacts S1*c*, S1*f* are closed and the remaining switch contacts are open C2, C3 and C5 are in circuit, while in the speaking condition, contacts S1*a*, S1*b*, S1*d*, S1*e* are closed and the remaining switch contacts are open C2 and C5 are out of circuit, C3 is short-circuited, C4 and C6 (a coupling condenser) are inserted, and the anti-side-tone bridge AST is connected through to line L1. Capacitor C3 must be short-circuited for the speaking condition, to enable central battery supply over the incoming lines to energise the transmitter amplifier, while L5 provides attenuation back to line of the locally generated calling signal. This signal is further attenuated in capacitor C5 connected across L1, L2, in the calling condition, the object of this being to prevent or reduce cross-talk arising from such fed-back signal.

There is thus provided in Fig. 3 a subset circuit with the normal signalling-in and speaking facilities without the use of a three-winding transformer or bell, and employing an electro-magnetic transmitting transducer which is inherently or potentially of better quality than the carbon transmitter normally provided. For calling the central exchange, raising of the gravity switch closes the subset loop through the bridge, and dialling may be carried out by dial contacts, shown diagrammatically at S2 across the lines L1, L2.

Fig. 4 shows a circuit arrangement for a subset to function equally on local battery or common battery supplies, and with gravity switch or recall facilities at choice.

In the figure, the oscillator as previously described is constituted by W1, R1, C1, and C2 and the primary winding of a transformer T1 which has the electro-magnetic microphone TX connected to its secondary winding. The position in the collector circuit formerly occupied by the microphone is now occupied by a choke LC.

The microphone is also connected in the collector-base circuit of a second transistor amplifier W2 forming the first of a two-stage transmitter amplifier arranged to receive power from battery B when switch S3A is depressed. Second stage W3 feeds via output transformer T2 into the line L1, L2, by way of anti-side-tone transformer T3. This provides the usual anti-side-tone facilities with balancing resistor R3, and having a receiver RX in its tertiary winding. RX is shown shunted by a click suppressor device of known form.

Links LK1 and LK2 provide semi-permanent alternative connections for local battery (L.B.) (point-to-provides a common battery signalling contact, e.g. a dial point) or common battery (C.B.) operation, switch S1 contact, switch contacts S2 a local battery signalling contact (non-locking), and S3A and S3B are gravity-switch or press-to-talk contacts.

With link LK2 in the position shown, and LK1 opened, calling a distant station is effected by pressing S2 to its right-hand contact, which closes a calling-and-ringing circuit and connects battery B direct to line. This battery signal is received at the distant station, having an identical circuit, with contacts S2 normal, and energises the W1 oscillator which will therefore oscillate, generating a ringing tone which is transferred to TX via T1. At the same time, this ringing tone appears on the line conductors and is received back over LK2, switch contacts S2 closed and R4, to develop a potential on R4 which is detected in the local receiver, via a circuit which includes S2 operated. LK2, C3, T3 full primary, and R3, thus providing a "ring-back" signal tone. This signal verifies that the distant station is being rung, and that the battery polarity of the calling station is correct for the distant transistor. The battery polarity shown in Fig. 4 is correct for a p-n-p type of junction used for W1; for an n-p-n junction, reversed polarity is required, and thus provision would need to be made to reverse the outgoing lines L1 and L2 if this proved to be necessary. Reversing the battery connections would upset the internal arrangements of the local set for speaking. In the speaking condition, the D.C. battery is not applied to the line, the speech signals alone being applied, via C3.

For common battery working, link LK1 is inserted and link LK2 turned over to contact CB, and then signalling to the exchange takes place at S1, and calling of a distant station takes place with 75 volt ringing current from the exchange, which is received via C3 and LK2 (turned over), S2 normal and the transistor oscillator, the incoming signal energising the oscillator, as previously described.

A few points in connection with this combination subset merit special mention. With S3A and S3B arranged as a press-to-talk switch, call or re-call is possible whether or not the handset comprising transmitter and receiver is on or off its cradle, and without damage to the ear of the listener since it is the transmitter that is energised.

Moreover, with a press-to-talk switch, the local amplifier is only energised for talking, and battery power may thus be conserved. The battery is in circuit only when talking or signalling and has no drain at other times.

If the advantages of a gravity-switch over a press-to-talk switch are preferred, in giving a normal telephone handset, then the re-call feature must be sacrificed, since S3B is permanently open while the handset is off its cradle.

Note that it is preferable on the grounds of simplicity to retain the local battery to operate the transistor amplifier in the common battery arrangement as well, and since the microphone is an electro-magnetic transducer, requiring no operating current, the common battery on the line is not required at the subset.

While the principles of the invention have been described above in connection with specific embodiments, and particular modifications thereof, it is to be clearly understood that this description is made only by way of example and not as a limitation on the scope of the invention.

What I claim is:

1. A telephone subscriber's set having a transmitter and a receiver comprising an electromagnetic transducer constituting the transmitter of the set, a transistor oscillator circuit connected thereto and having a natural frequency of oscillation partly determined by said transducer, and means responsive to an incoming electrical signal of a different frequency to cause said transistor circuit to generate voice frequency currents for activating said transducer to emit a calling tone.

2. A telephone subscriber's set having a transmitter and a receiver and comprising an electromagnetic transducer constituting the said transmitter of the set, a transistor oscillator circuit, and means causing said transistor oscillator to oscillate in response to an incoming electrical signal and to generate voice frequency currents for activating said transducer to emit a calling tone independently of any acoustic feed-back between said transmitter and receiver.

3. A telephone subscriber's set comprising an electromagnetic transducer constituting the transmitter of the set, a transistor oscillator circuit connected thereto and having a natural frequency of oscillation partly determined by said transducer, means responsive to an incoming electrical signal of a different frequency to cause said transistor circuit to generate voice frequency currents for activating said transducer to emit a calling tone, and means connected to said transistor oscillator to convert it to a transistor amplifier for said transducer when the latter is in use as a microphone.

4. A telephone subscriber's set comprising an electromagnetic transducer constituting the transmitter of the set, a transistor oscillator circuit connected thereto and having a natural frequency of oscillation partly determined by said transducer, means responsive to an incoming electrical signal of a different frequency to cause said transistor circuit to generate voice frequency currents for activating said transducer to emit a calling tone, a feed-back path for said transistor oscillator, and including switch means to open said feed-back path when said transistor oscillator is to be converted to a transistor microphone amplifier.

5. A telephone subscriber's set according to claim 4, in which additional means are provided for simultaneously switching in a decoupling condenser across said transistor circuit to prevent feed-back in said transistor amplifier.

6. A subscriber's set according to claim 4 having switch means effective in one position to supply local battery thereto and effective in another position to supply common central office battery thereto, and a second transistor amplifier is connected to said transducer to amplify the microphone signals from said transducer only when said switch means is in said one position.

7. A subscriber's set according to claim 6 in which an anti-side tone bridge is connected between the output circuit of said second transistor and the receiver of the subscriber's set to balance out at the receiver the amplified microphone signals.

8. A telephone subscriber's set comprising an electromagnetic transducer constituting the transmitter of the set, a transistor oscillator circuit connected thereto and having a natural frequency of oscillation partly determined by said transducer, means responsive to an incoming electrical signal of a different frequency to cause said transistor circuit to generate voice frequency currents for activating said transducer to emit a calling tone, a feedback path for said transistor oscillator, including switch means to open said feed-back path when said transistor oscillator is to be converted to a transistor microphone amplifier, and separate switch means are provided and effective in one setting for supplying the subscriber's set with local battery to cause it to function as a local battery set, and effective in another setting to cause the subscriber's set to function as a common central office battery set.

9. A telephone subscriber's set comprising an electromagnetic transducer constituting the transmitter of the set, a transistor oscillator circuit, means for causing said circuit to oscillate in response to an incoming electrical signal and to generate voice frequency currents for activating said transducer to emit a calling tone, a separate transistor amplifier, switch means for connecting said separate transistor amplifier to the output of said transmitter and for causing said oscillator to cease oscillating.

10. A telephone subscriber's set comprising an electromagnetic transducer constituting the transmitter of the set, a transistor oscillator circuit, means for causing said circuit to oscillate in response to an incoming electrical signal and to generate voice frequency currents for activating said transducer to emit a calling tone, a normally closed circuit connecting transistor oscillator across the telephone talking wires to which the sub-set is connected and including a change-over switch contact set which is arranged to be moved to an off-normal position to connect a local battery across the said talking wires to provide an out-going calling and ringing circuit for a similar remote subscriber's set, said outgoing calling and ringing circuit including an impedance across which the receiver of the calling sub-set is shunted, whereby the ringing tone generated in said remote subscriber's set in response to the said ringing signal from the local subscriber's set is detected as a ring-back tone.

References Cited in the file of this patent

UNITED STATES PATENTS

| | | |
|---|---|---|
| 1,495,295 | Fletcher | May 27, 1924 |
| 2,283,646 | Nicholas | May 19, 1942 |
| 2,332,551 | Bascom | Oct. 26, 1943 |
| 2,487,455 | Lesti | Nov. 8, 1949 |
| 2,604,545 | Inglis | July 22, 1952 |
| 2,759,179 | Kircher | Aug. 14, 1956 |
| 2,761,909 | Wallace | Sept. 4, 1956 |
| 2,818,470 | Busala | Dec. 31, 1957 |